United States Patent
Chou

(10) Patent No.: US 7,634,673 B2
(45) Date of Patent: *Dec. 15, 2009

(54) COMPUTER HOST WITH BUS INTERFACE PROVIDING OUTPUT POWER

(75) Inventor: Ching-Ling Chou, Taipei Hsien (TW)

(73) Assignee: Topower Computer Industrial Co., Ltd., Taipei Hsien (TW)

( * ) Notice: Subject to any disclaimer, the term of this patent is extended or adjusted under 35 U.S.C. 154(b) by 484 days.

This patent is subject to a terminal disclaimer.

(21) Appl. No.: 11/586,641

(22) Filed: Oct. 26, 2006

(65) Prior Publication Data

US 2008/0104426 A1    May 1, 2008

(51) Int. Cl.
*G06F 1/26* (2006.01)
(52) U.S. Cl. .................. 713/300; 713/310; 713/323
(58) Field of Classification Search .................. 713/300
See application file for complete search history.

(56) References Cited

U.S. PATENT DOCUMENTS

| | | | |
|---|---|---|---|
| 6,920,573 B2 * | 7/2005 | Lee | 713/323 |
| 7,051,144 B2 * | 5/2006 | Kim et al. | 710/305 |
| 7,203,777 B2 * | 4/2007 | Morita et al. | 710/74 |
| 7,334,141 B2 * | 2/2008 | Allen et al. | 713/320 |
| 7,509,444 B2 * | 3/2009 | Chiu et al. | 710/51 |
| 2007/0088964 A1 * | 4/2007 | Lee | 713/300 |

* cited by examiner

*Primary Examiner*—Nitin C Patel
(74) *Attorney, Agent, or Firm*—Muncy, Geissler, Olds & Lowe, PLLC

(57) ABSTRACT

A computer host with bus interface includes a power supply and a motherboard. The power supply has a main power system and a standby power system. The DC power outputted by the standby power system is used to drive a power on/off unit, which is used for outputting a computer operating signal and a computer shutdown signal. The motherboard has a logic operation circuit and a data transmission port electrically connected to inner electronic device. A bus interface is installed on the computer host and the bus interface has a power transmission terminal and a data transmission terminal. The data transmission terminal is electrically connected with the data transmission port of the motherboard, and the power transmission terminal is electrically connected to the standby power system such that the bus interface can receive the DC power from the standby power system when the computer host is under operation or shutdown.

5 Claims, 3 Drawing Sheets

COMPUTER HOST WITH BUS INTERFACE PROVIDING OUTPUT POWER

FIELD OF THE INVENTION

The present invention is related to a computer host with bus interface, and more particularly to a computer host which can supply DC power to the bus interface even during shutdown period.

BACKGROUND OF THE INVENTION

For the ATX standard of motherboard, one characteristic thereof is that, except the DC power (3.3 V, 5 V, 12 V . . . ) provided during operation, a standby power system is also provided for supplying a starting power to the computer host, no matter the computer is under operation or shutdown.

For the current computer technology, except the operating system and other applications, there still has many external electronic devices which are operated independently as the computer host is shutdown, for example, speaker, night light, playing music CD directly through the panel of CD-ROM drive, mobile phone charging socket, etc., can be independently operated under shutdown situation, or a small LED mounted on the computer case for displaying information of temperature, humidity, time, or a bright and dazzling computer case with an illuminating efficiency.

However, the personal computer in the market seems to lack these functions. The reason is the space inside the computer host is extremely limited so that it is always insufficient to install additional power supplying module after installing the inner electronic devices, such as hard disk drive, CD-ROM drive, motherboard . . . , etc. Further, for utilizing the standby power from the power supply after shutdown, the panel of the case must be opened for installing extra sockets, and additional power lines have to be disposed inside the computer host for providing the DC power from the standby power to the external electronic devices which are connected to the sockets. But, it is obvious that the ideas described above diverge from the trends of compact volume, organized inner cable, and simplified case panel which are used for current personal computer.

Furthermore, the current personal computer always has the USB interface disposed thereon. Generally, except being used for data transmission, the USB interface also provides a 5 V DC power. However, after the computer is shutdown, the power transmission is also stopped. Therefore, if the original USB interface (or other available buses, such as IEEE 1394 bus interface) can be utilized to provide the DC power no matter the computer is under operation or shutdown, then the external electronic devices with the corresponding USB connector can directly draw the DC power from the USB interface on the computer host, so that the convenience can be improved and the problem of insufficient space also can be solved.

SUMMARY OF THE INVENTION

The object of the present invention is to provide a computer host with bus interface, in which the bus interface is powered by the standby power from the power supply as the computer host is under operation or shutdown, thereby any external electronic device having the corresponding connector can utilize the bus interface to draw the DC power no matter the computer host is under operation or shutdown.

For achieving the object described above, the preferred embodiment in the present invention includes: a power supply and a motherboard electrically connected to the power supply. The power supply has a main power system and a standby power system, wherein the DC power outputted by the standby power system is used to drive a power on/off unit, which is used for outputting a computer operating signal and a computer shutdown signal. The motherboard has a logic operation circuit and a data transmission port electrically connected to inner electronic device. A bus interface is installed on the computer host and the bus interface has a power transmission terminal and a data transmission terminal, wherein the data transmission terminal is electrically connected with the data transmission port of the motherboard, and the power transmission terminal is electrically connected to the standby power system such that the bus interface can receive the DC power from the standby power system no matter the computer host is under operation or shutdown.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DESCRIPTION OF THE PREFERRED EMBODIMENT

Figure 1:
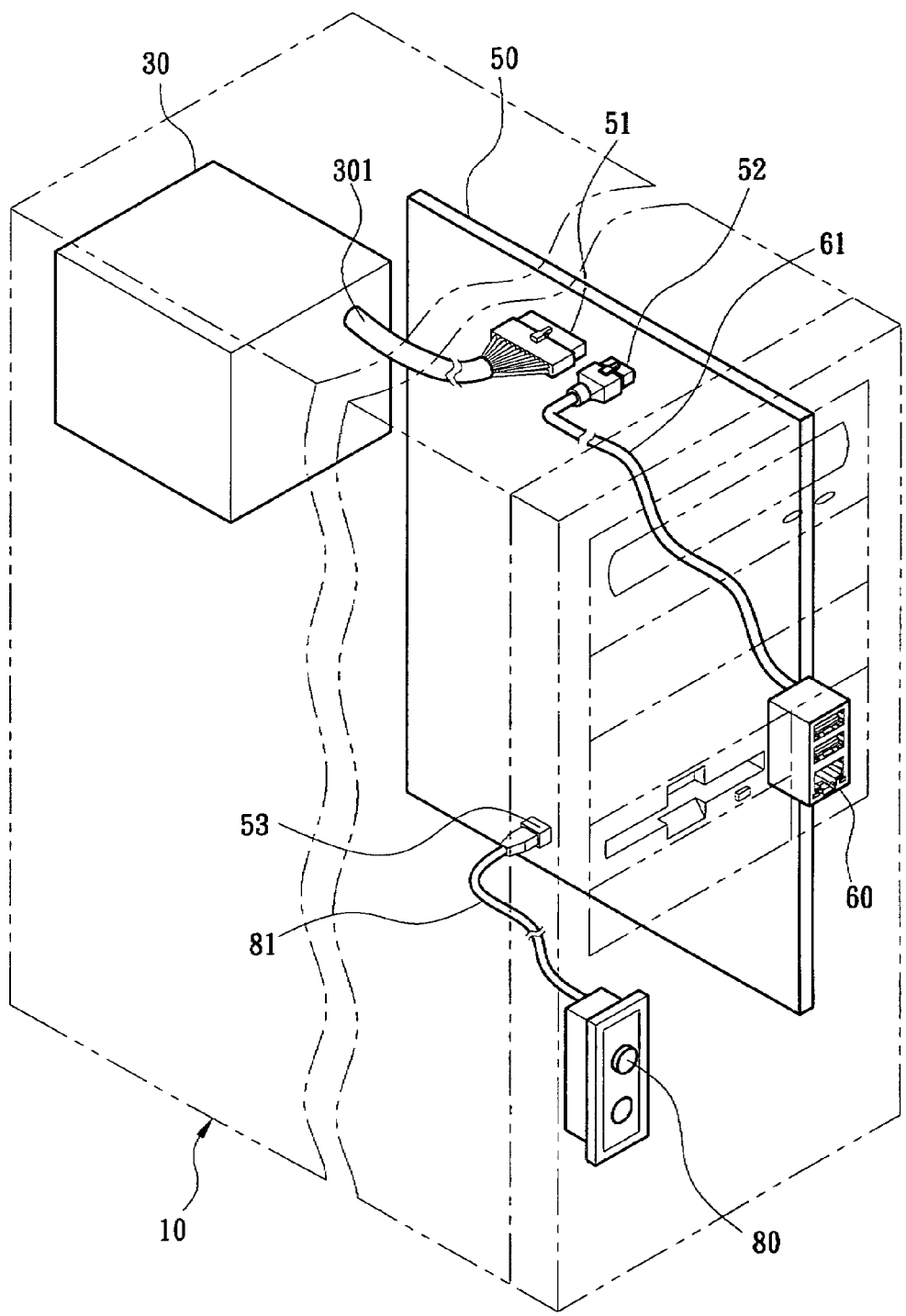
FIG. 1 is a structural drawing showing a preferred embodiment according to the present invention.
Figure 3:
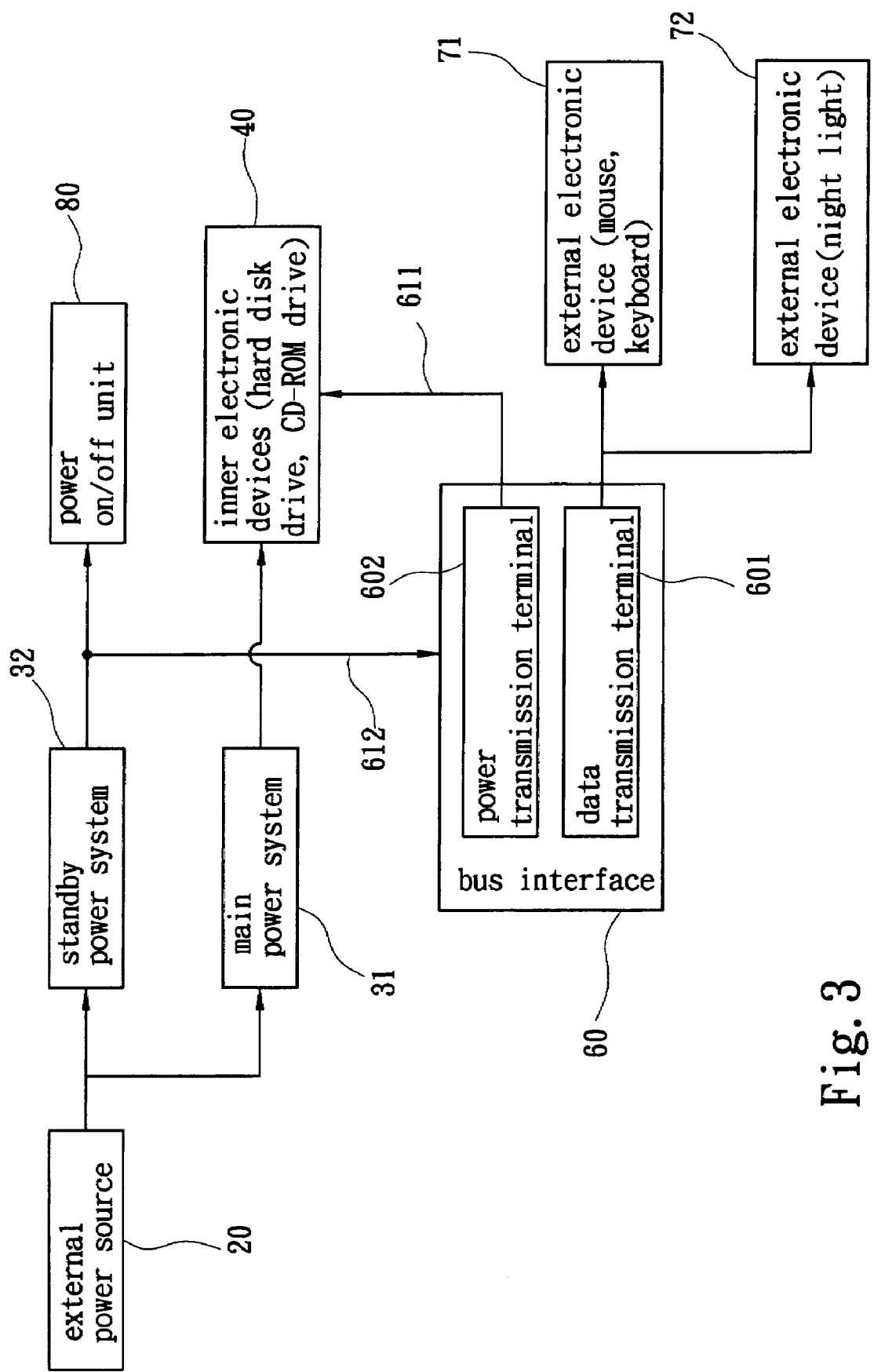
FIG. 3 is a circuit block showing a preferred embodiment according to the present invention.

Refer to FIGS. 1 and 3, which are respectively a structural drawing and a circuit block of a preferred embodiment according to the present invention. As shown, the present invention is related to a computer host with bus interface, wherein the computer host 10 includes:

a power supply 30 having a main power system 31 electrically connected to an external power source 20 (which can be mains electricity) for converting thereof into DC power, and a standby power system 32 also connected to the external power source 20 in parallel with the main power system 31 for converting the external power source into DC power, wherein the DC power outputted by the main power system 31 is used to drive at least one inner electronic device 40 (such as motherboard, hard disk drive, CD-ROM drive . . . , etc.) and the DC power outputted by the standby power system 32 is used to drive a power on/off unit 80, which is used for outputting a computer operating signal and a computer shutdown signal, thereby controlling the operating or shutdown of the computer, so that, under operation, the main power system 31 has a DC power output, and during shutdown, the main power system 31 interrupts power supply (but the standby power system 32 remains to supply power under the AXT standard);

a motherboard 50 electrically connected to the main power system 31 and the standby power system 32, wherein the electrical connection between the motherboard 50 and the power supply 30 is provided by a power line 301 from the power supply 30 plugging into a socket 51 on the motherboard 50 so as to transmit power signal (including 5Vstb), and the motherboard 50 has a logic operation circuit and data transmission ports (which are also called I/O ports, and only a data transmission port 52 connected to the bus 60 is depicted in the drawings) for electrically connecting to other inner electronic devices 40, so that the inner electronic devices 40, such as hard disk drive, CD-ROM drive, may transmit data signal to the motherboard 50 through the data transmission port for being processed by the logic operation circuit, and wherein the motherboard 50 further includes a starting-power transmission port 53 which may equip the DC power outputted by the standby power system 32 through the circuits on the motherboard 50, and the power transmission line 81 of the power on/off unit 80 is namely plugged into the starting-power transmission port 53 so as to electrically connect to the standby power system 32; and a bus interface 60 (which is not limited to be USB (Universal Serial Bus) or IEEE 1394 bus) installed on the surface of computer host 10 and having terminals divided into a power transmission terminal 601 and a data transmission terminal 602, wherein the data transmission terminal 602 is electrically connected with the motherboard 50 or other inner electronic devices 40 for data transmission, and the power transmission terminal 601 is electrically connected to the standby power system 32 for drawing the DC power so that the bus interface 60 can receive the DC power outputted from the standby power system 32, no matter the computer host 10 is under operation or shutdown.

In this preferred embodiment, the bus interface 60 is connected to the motherboard 50 by a power/signal transmission line 61 (which is an integration of a power transmission line 612 and a signal transmission 611 as shown in FIG. 3) and is electrically connected to the standby power system 32 through the data transmission port 52 (which also provides a power output) of the motherboard 50, so that when the computer host 10 is under operation, an external electronic device 71 (which needs power and data transmission both), such as mouse, keyboard, can be plugged thereinto, and when the computer host 10 is shutdown, since the bus interface 60 also can receive the power from the standby power system 32, other external electronic devices 72, such as night light, mobile phone charger, also can be plugged thereinto for drawing a power output.

Figure 2:
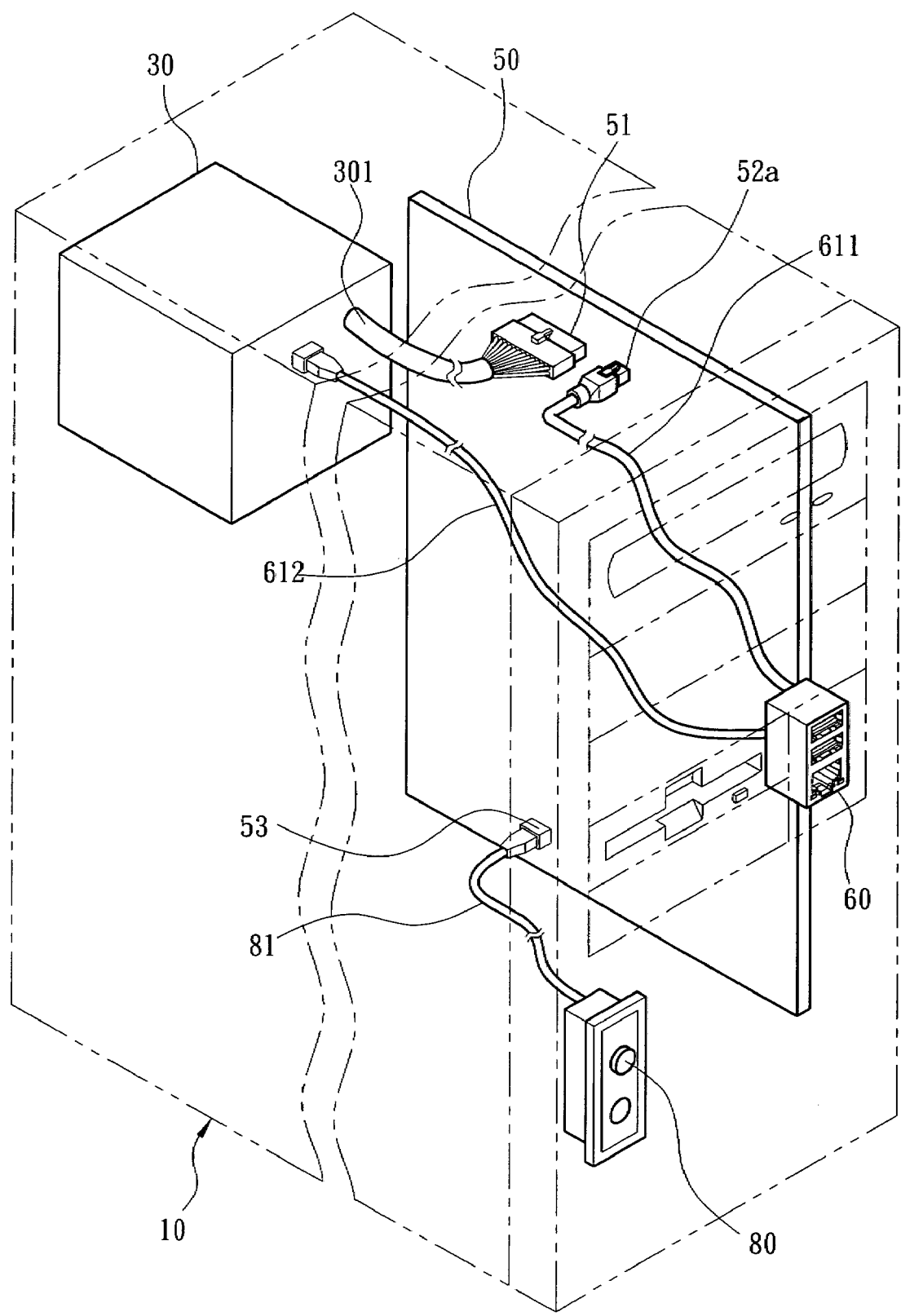
FIG. 2 is a structural drawing showing another preferred embodiment according to the present invention.

Refer to FIG. 2 which is another embodiment according to the present invention, wherein the bus interface 60 is equipped with a signal transmission line 611, which is connected with the data transmission port 52a of the motherboard 50 for data signal transmission, and also equipped with a power transmission line 612, which is connected to the power supply 30 for electrically connecting to the standby power system 32. Therefore, the efficiency identical to the embodiment described above can be achieved. In the aforesaid, the present invention provides a computer host 10 whose standby power system 32 in the power supply 30 may supply power to the bus interface 60 no matter under operation or shutdown, thereby external electronic devices 71, 72 having a corresponding connector (such as USB, IEEE 1394) can utilize the bus interface 60 to obtain the DC power from the standby power system 32 as the computer host is under operation or shutdown. Consequently, the power utilization can be improved.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A computer host with bus interface, comprising:
   a power supply having a main power system electrically connected to an external power source for converting thereof into a DC power, and a standby power system electrically connected to the main power system in parallel for converting the external power source into a DC power, wherein the DC power outputted by the main power system is used to drive at least one inner electronic device and the DC power outputted by the standby power system is used to drive a power on/off unit, which is used for outputting a computer operating signal and a computer shutdown signal;
   a motherboard electrically connected to the main power system and the standby power system, wherein the motherboard has a logic operation circuit and a data transmission port electrically connected to the inner electronic device; and
   a bus interface installed on the computer host and having a power transmission terminal and a data transmission terminal, wherein the power transmission terminal is electrically connected to the data transmission port of the motherboard, and the power transmission terminal is electrically connected to the standby power system such that the bus interface receives the DC power from the standby power system whether the computer host is under operation or shutdown.

2. The computer host with bus interface as claimed in claim 1, wherein the bus interface has a power/signal transmission line connected to the motherboard and electrically connected to the standby power system through the motherboard.

3. The computer host with bus interface as claimed in claim 1, wherein the bus interface has a signal transmission line connected to the motherboard for data signal transmission and a power transmission line connected to the power supply so as to electrically connect to the standby power system.

4. The computer host with bus interface as claimed in claim 1, wherein the bus interface is a USB (Universal Serial Bus) interface.

5. The computer host with bus interface as claimed in claim 1, wherein the bus interface is an IEEE 1394 bus interface.

* * * * *